May 24, 1938. J. L. CREVELING 2,118,373
LUBRICATING DEVICE
Filed Sept. 17, 1931

INVENTOR
JOHN L. CREVELING
BY
ATTORNEY

Patented May 24, 1938

2,118,373

UNITED STATES PATENT OFFICE 2,118,373

LUBRICATING DEVICE

John L. Creveling, Tucson, Ariz., assignor to The Lubrication Corporation, South Bend, Ind., a corporation of Delaware Application September 17, 1931, Serial No. 563,402

5 Claims. (Cl. 221—47.3)

This invention relates to lubrication guns and is illustrated as embodied in a compression gun of the high pressure type.

An object of the invention is to provide a lubricating gun in which the high pressure cylinder is charged from an easily filled low pressure reservoir.

A feature of the invention relates to the charging of the high pressure cylinder with lubricant which is preferably filled from a cartridge or container which may be removed when empty and replaced when refilled or have a similar, charged receptacle substituted for it. The container is preferably arranged at one side of the high pressure cylinder and supplies the lubricant through a port in the side wall of the cylinder which is uncovered by a plunger at the outer end of the charging stroke and covered during the first part of the pressure stroke.

Another feature of the invention relates to a movable follow up piston within the container which reduces the volume of the lubricant chamber as it is used and which, if desired, may be manually moved to apply pressure on the lubricant in the container and forcibly introduce it into the high pressure cylinder.

Other objects and features of the invention will be apparent from the following description of certain embodiments which I have shown in the accompanying drawing in which.

Figure 1:
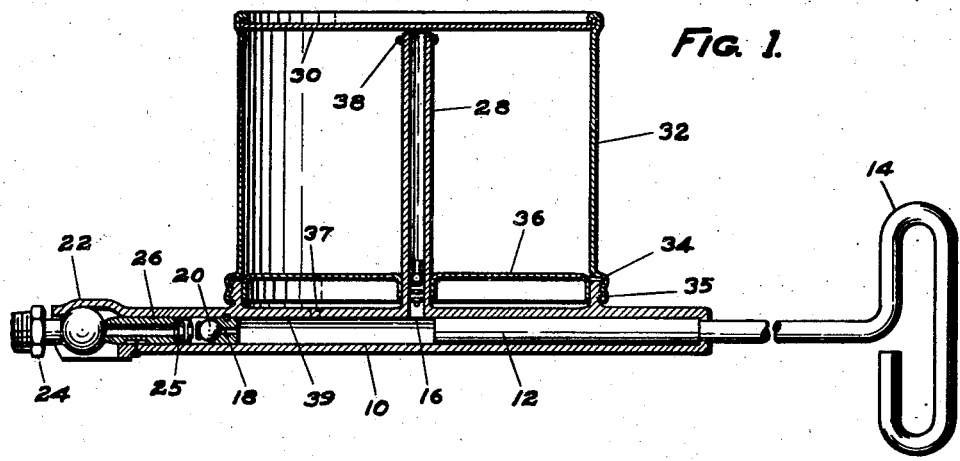
Figure 1 is a longitudinal section through a lubricating gun constructed in accordance with the invention in which the high pressure cylinder is fed through a replaceable container having a piston moving at right angles to the cylinder.

Referring to Figure 1, 10 is a high pressure uniform diameter cylinder enclosing a fitted plunger 12 having a handle 14, which reciprocates in the cylinder and uncovers port 16 at the outer end of its stroke. Outward movement of the plunger creates a vacuum in the cylinder 10 which draws lubricant through port 16 to fill the cylinder. The port 16 is covered during initial movement of the plunger and lubricant is trapped between the plunger and the discharge opening 18, which is closed by a spring pressed check valve 20, to permit the lubricant to flow in one direction to coupling 22, which is adapted to grip a fitting 24 by the pressure of the lubricant on cup 25 secured to slidable tube 26 and make a grease tight joint between the end of the tube and the fitting. Port 16 is the outlet for a tube 28 which projects at right angles from the cylinder 10 and terminates slightly below the end cover or closure 30 of a replaceable lubricant container 32, which is detachably secured to the gun by lip members 34, which engage complementary projections 35 formed on the body portion of the gun. Within the container 32 is a follow up piston 36, which ordinarily remains in assembled relation with the gun when the detachable container is removed. Piston 36 is guided by tubular member 28, and advances toward the top of the container as the lubricant is consumed by being drawn through the port 16 into the cylinder 10.

The under side of piston 36 may be vented by cutting away portions of projection 35, or by providing opening 37 in the disc like base 39 but this is not essential, as in ordinary operation there is sufficient leakage of air between the lip members 34 and the projection portions to prevent the formation of a vacuum on the under side of the piston. A spring washer 38 may, if desired, be snapped in a groove formed on the upper end of tube 28 to prevent piston 36 from slipping off the end of the tube when the detachable container 32 is removed for the installation of a charged container to replace one from which the lubricant has been exhausted.

Figure 2:
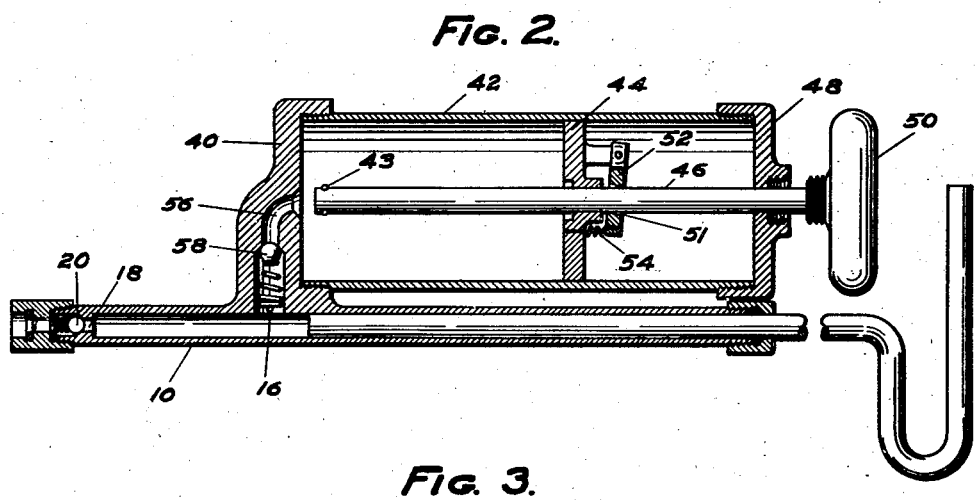
Figure 2 is a modified form of the invention in which the axis of the lubricant container is arranged parallel to the high pressure cylinder and is of the semi-permanent type having a piston which is adapted both to follow up the lubricant or to be manually moved to discharge the same.

In the construction shown in Figure 2, I have shown a coupling which is adaptable for use with the fitting disclosed in my co-pending application Serial No. 5,270, filed January 28, 1925, and in which the member 40 connected to or integral with the high pressure cylinder forms a closure for one end of the container 42 which may be threaded to the closure in a semipermanent installation or may be equipped with quick detachable portions similar to that illustrated in Figure 1.

Within container 42 is a follow-up piston 44 slidably mounted on a guide 46 which is slidable within the cover 48, and may be moved relative to the cylinder by handle 50. Piston 44 may move freely to follow up the lubricant when the guide 46 remains stationary or the guide may be moved outwardly without disturbing the piston, but movement of the guide 46 toward the lubricant causes the edge of the latch member 52 at one side of the opening 51 to engage the rod and move both piston and guide as a unit toward the lubricant. Latch member 52 is maintained in engagement with the guide by spring 54 which yields during the outward movement of the handle 50 and permits the operator forcibly to move the piston to discharge lubricant through passage 56 past the spring loaded check valve 58 into the discharge port 16 of the high pressure cylinder 10.

When container 42 is empty and piston 44 has contacted with the stop 43, cover 48 may be removed and the guide and piston withdrawn from the container to permit refilling with lubricant. Prior to reassembly of the gun, latch 52 is released manually and piston 44 is moved on the guide toward cover 48, so as to be in position to contact the lubricant in the filled container.

Figure 3:
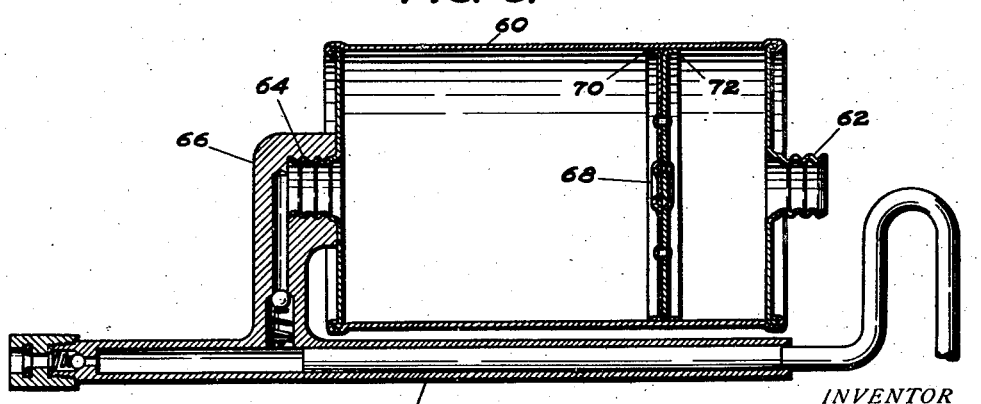
Figure 3 is a further modified form illustrating a detachable lubricant container having similar ends, either of which may be used as the discharge opening or as an opening for refilling the container with lubricant.

In the form shown in Figure 3, the lubricant container 60 is formed with similar threaded ends, 62 and 64, either of which may be threaded into the end member 66, forming an inlet conduit to cylinder 10. Within the container 60 is a piston 68 provided with oppositely extending washers or followers 70 and 72, which act to exert pressure in either direction, depending on the direction of movement of the piston. The followers 70, and 72 are preferably of cup-shape and may be made of sheet metal or of organic material, but if made in two parts are preferably secured together. Container 60 is detachable and after piston 68 has moved to the extreme left, empty container 60 may be removed from the gun and inserted in a supply of lubricant for refilling the container. It is immaterial which side of the cylinder 60 acts as the lubricant reservoir and the container may be connected at or filled from either end. As shown in Figure 3, the portion to the left of piston 68 forms the lubricant chamber and the opening in projection 62 renders the piston accessible for the insertion of a suitable tool which may be used to force piston 68 toward the left and discharge the lubricant to the high pressure cylinder 10. Under ordinary circumstances atmospheric pressure may be sufficient to urge the piston 68 toward the discharging end.

While I have illustrated and described several embodiments of the invention, it is to be understood that this showing and description are illustrative only, and that I do not regard the invention as limited to the forms shown and described, or otherwise, except by the terms of the following claims.

I claim:

1. In a grease gun, a body having a lubricant chamber with an inlet and an outlet, a cap on the body around the inlet, a tube projecting from the cap in a direction parallel to the axis thereof and at a right angle to the axis of the said chamber with its passage in communication with the inlet, a removable lubricant container having an open end threadedly connected to the cap, and a piston slidably mounted on the tube in the container to force the lubricant inwardly through the tube and inlet.

2. A lubricant gun including, a body having a chamber with an inlet opening, a tubular member permanently secured to and projecting from the body in communication with the opening, a piston slidable on the tubular member, a lubricant cartridge open at its inner end, closed at its outer end and adapted to receive the piston, and means for connecting the cartridge to the body with the piston within the cartridge including a threaded connection between the inner end of the cartridge and the body forming the sole means for holding the cartridge in position to cooperate with the piston.

3. A lubricant gun including, a body having a chamber with a lateral opening, a tubular member permanently secured to and projecting laterally from the body in communication with the opening, a piston slidable on the tubular member, a lubricant cartridge open at its inner end, closed at its outer end and adapted to receive the piston, and means for connecting the cartridge to the body with the piston within the cartridge including a threaded connection between the inner end of the cartridge and the body forming the sole means for holding the cartridge in position to cooperate with the piston.

4. A lubricating device comprising a lubricant pump having an inlet and an outlet, a tubular member connected to said pump in communication with the inlet and extending outwardly from the pump, an annular connecting member carried by the pump concentric with the tubular member, and a lubricant cartridge having means at one end for attachment to said connecting member and having an opening in said end through which the tubular member may project to a point adjacent the other end of the cartridge.

5. A lubricating device comprising a lubricant pump having an inlet and an outlet, a tubular member connected to said pump in communication with the inlet and extending outwardly from the pump, an annular screw-threaded connecting member carried by the pump concentric with the tubular member, and lubricant cartridge having threads at one end for attachment to said connecting member and having an opening in said end through which the tubular member may project to a point adjacent the other end of the cartridge.

JOHN L. CREVELING.